United States Patent [19]

Dodd

[11] 3,934,560
[45] Jan. 27, 1976

[54] INTEGRATED PRECOMBUSTION CHAMBER FOR INTERNAL COMBUSTION ENGINES

[75] Inventor: Joseph L. Dodd, Farmington, Mich.
[73] Assignee: Teledyne Industries, Inc., Los Angeles, Calif.
[22] Filed: Feb. 21, 1974
[21] Appl. No.: 444,399

[52] U.S. Cl............ 123/32 B; 123/32 SP; 123/48 B
[51] Int. Cl.² ............................................ F02B 3/00
[58] Field of Search ........... 123/32 SP, 32 ST, 32 B, 123/32 L, 191 S, 191 SP, 48 B

[56] References Cited
UNITED STATES PATENTS

| | | | |
|---|---|---|---|
| 820,285 | 5/1906 | Cross | 123/32 SP |
| 910,220 | 1/1909 | Nichols | 123/32 B |
| 1,354,786 | 10/1920 | Tartrais | 123/32 SP |
| 1,772,742 | 8/1930 | Barrett | 123/32 B |
| 2,254,438 | 9/1941 | McCarthy | 123/32 SP |
| 2,483,288 | 9/1949 | Malin | 123/32 SP |
| 2,831,468 | 4/1958 | Witzky | 123/32.2 |
| 3,079,901 | 3/1963 | Hallberg | 123/32 SP |
| 3,303,831 | 2/1967 | Sherman | 123/48 B |

*Primary Examiner*—Charles J. Myhre
*Assistant Examiner*—Daniel J. O'Connor
*Attorney, Agent, or Firm*—Gifford, Chandler & Sheridan

[57] ABSTRACT

In an internal combustion engine having a cylinder, a working piston reciprocally located therein and a cylinder head cooperating to define a combustion chamber, the incorporation therein of a precombustion chamber formed in the space of the main combustion chamber and further dividing the main combustion chamber into secondary combustion chambers. Apertures in the precombustion chamber provide for communication between the precombustion chamber and the secondary combustion chambers to promote flame front propagation therebetween. The intake and exhaust ports as well as ignition means are located in the precombustion chamber.

11 Claims, 5 Drawing Figures

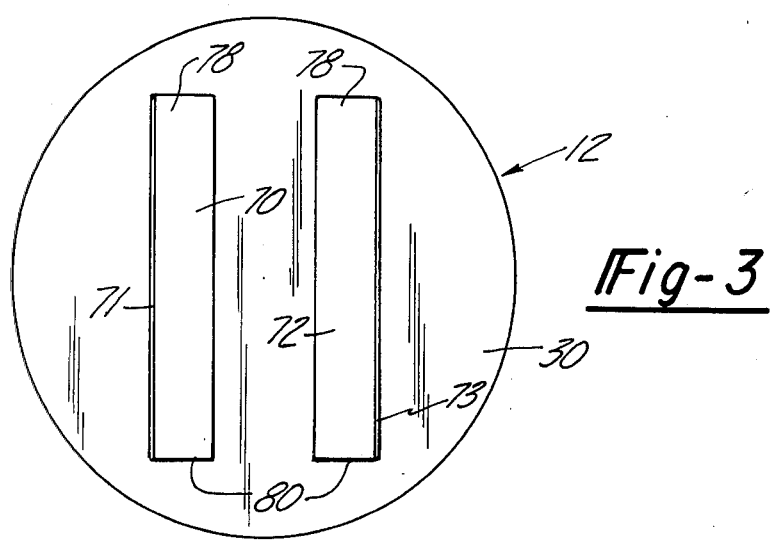
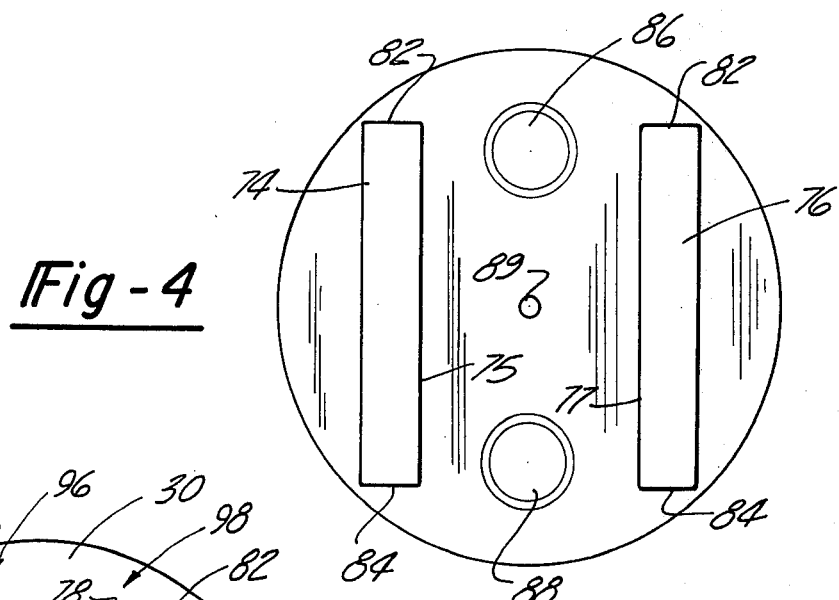
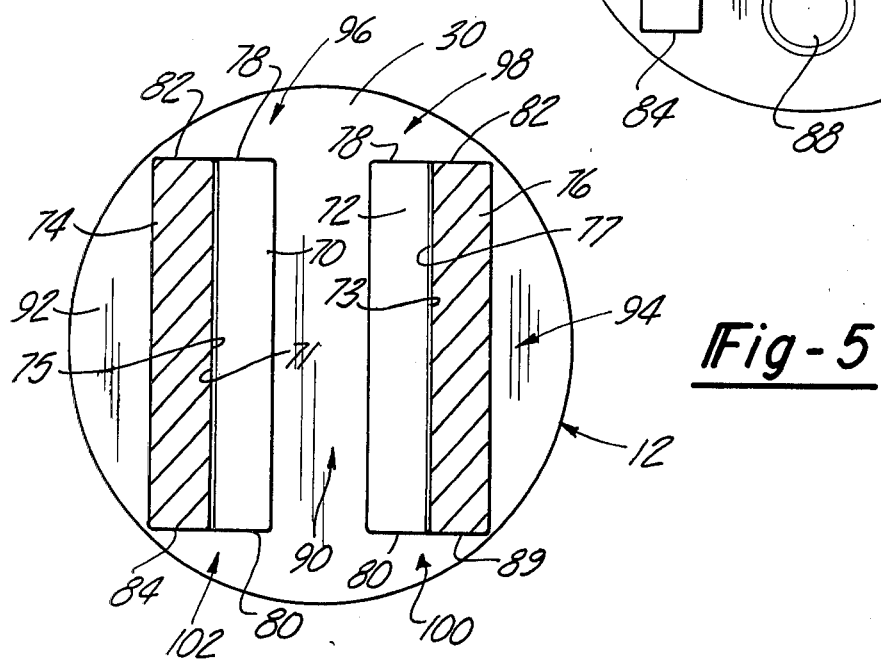

INTEGRATED PRECOMBUSTION CHAMBER FOR INTERNAL COMBUSTION ENGINES

BACKGROUND OF THE INVENTION

I. Field of the Invention

The present invention relates generally to internal combustion engines and, more particularly, to precombustion chambers for internal combustion engines.

II. Description of the Prior Art

Although the present invention is adapted for use with various kinds of internal combustion engines having either a fixed piston or a two-part variable compression ratio (VCR) piston, particular advantage is realized by utilizing the invention in cooperation with a variable compression ratio piston similar to the type disclosed in U.S. Pat. No. 3,303,831 to Clarence A. Sherman, issued Feb. 14, 1967.

Precombustion chambers are provided for delivering an ignited fuel mixture to the main combustion chamber to aid in combustion. It has been found that optimum performance may be obtained in the operation of internal combustion engines when the volume of the precombustion chamber is maintained at some predetermined ratio of the volume of the main combustion chamber.

If a VCR piston is employed in an internal combustion engine, the volume of the main combustion chamber constantly varies throughout the operation as there is relative movement between the two parts which make up the VCR piston, and, thus, there will be a constant, incremental change in the volume of the main combustion chamber. Since there is a change in the volume of the main combustion chamber, the use of conventional precombustion chambers with a VCR piston is not favored as the aforementioned optimum proportion of the volume of the precombustion chamber to the main combustion chamber cannot be maintained as the volume of the main combustion chamber is variable while the volume of the precombustion chamber is constant.

It is therefore desirable to provide an internal combustion engine employing a VCR piston with a precombustion chamber, the volume of which is changed to maintain a predetermined constant volume ratio between its volume and the changing volume of the main combustion chamber.

SUMMARY OF THE INVENTION

The present invention comprises a precombustion chamber for an internal combustion engine having a cylinder, a piston reciprocally located in the cylinder, and a cylinder head closing the top of the cylinder which cooperate to form a combustion chamber, the volume of which varies as the piston reciprocates in the cylinder. Means defining a precombustion chamber interior to the main combustion chamber and dividing the balance of the main combustion chamber into at least two secondary combustion chambers is structurally associated with the cylinder head and piston crown. Apertures provide communication between the precombustion chamber and the secondary combustion chambers.

The precombustion chamber of the present invention can be utilized in both compression ignition and spark ignition engines. In a spark ignition engine, the inlet and exhaust ports, as well as the ignition means or spark plug, are preferably disposed within the precombustion chamber. In a compression ignition engine, the inlet and exhaust ports as well as the fuel injection nozzle are preferably disposed within the precombustion chamber.

It is an object of the present invention to provide an improved construction for a precombustion chamber of an internal combustion engine having a volume maintained at a predetermined proportion of the volume of the secondary chambers, and therefore the main combustion chamber, formed from the main combustion chamber.

It is another object of the present invention to provide a precombustion chamber for an internal combustion engine adapted to be utilized in conjunction with a two-part variable compression ratio (VCR) piston and providing a volume of the precombustion chamber maintained at a predetermined constant volume ratio between the precombustion chamber and the secondary chambers formed from the main combustion chamber.

It is a further object of the present invention to provide a precombustion chamber in an internal combustion engine which is relatively simple and inexpensive to manufacture.

Other objects, advantages, and applications of the present invention will become apparent to those skilled in the art upon reading the following disclosure.

BRIEF DESCRIPTION OF THE DRAWINGS

The description herein makes reference to the accompanying drawings wherein like reference numerals refer to like parts throughout the several views, and in which:

FIG. 3 is a top view of the piston of FIG. 1;

FIG. 4 is a bottom view of the cylinder head of FIG. 1; and

FIG. 5 is a view in the direction of 5—5 of FIG. 1.

DESCRIPTION OF THE PREFERRED EMBODIMENT

Figure 1:
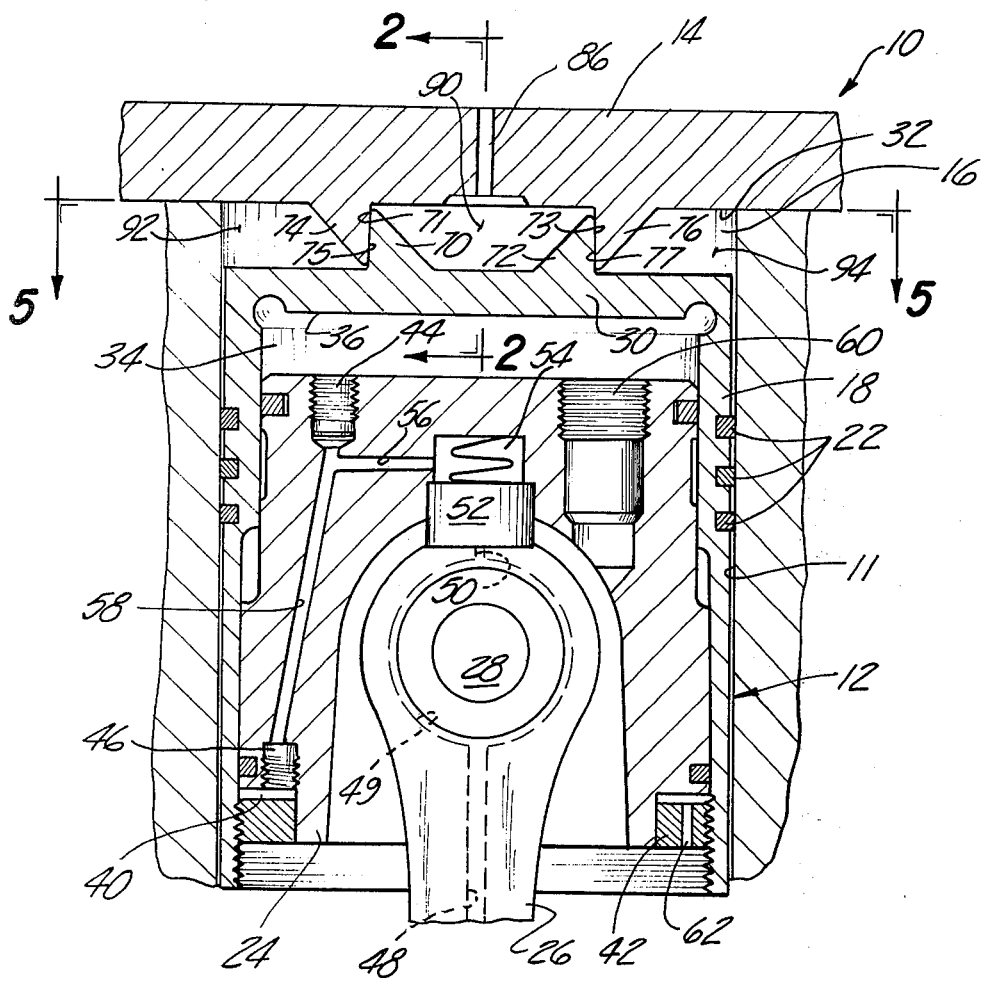
FIG. 1 is a fragmentary sectional view through a cylinder of an internal combustion engine having a piston and cylinder head constructed in accordance with the principles of the present invention and illustrating its use with a VCR piston.

FIG. 1 illustrates a portion of an internal combustion engine, generally denoted as 10, comprising a cylinder 11, a working piston 12 reciprocally disposed in the cylinder 11, and a cylinder head 14 which closes the top of the cylinder 11. The cylinder 11, piston 12 and cylinder head 14 cooperate to define a main combustion chamber 16.

As best seen in FIG. 1, the piston 12 is illustrated as a variable compression ratio (VCR) piston. The VCR piston comprises two main components; a piston shell 18, or outer component, having grooves around its outer surface to carry piston rings 22; and a piston pin carrier 24, or inner component. The carrier 24 is linked to a crankshaft (not shown) of the internal combustion engine 10 by a connecting rod 26 and a piston pin 28. The carrier 24 always moves between fixed upper and lower limits, whereas the piston shell 18 is free to move within certain limits relative to the carrier 24. This relative movement provides for a variable height from the center of the piston pin 28 to the top of the piston or crown 30, thus effecting a variation of the compression ratio through a change in the distance between the crown 30 of piston 12 and a bottom surface 32 of the cylinder head 14, all of which is well known and conventional in construction.

The movement of the piston shell 18 is restrained hydraulically by oil contained within an upper chamber 34 formed between inner surface 36 of the crown 30 and the top of the carrier 24 and by oil contained in an annular lower chamber 40 formed between the carrier 24 and a ring 42 carried by the piston shell 18. The relative positions of the piston shell 18 and the carrier 24 with respect to each other is determined by the quantity of oil in, and thus the volumes, of the upper and lower chambers 34 and 40.

The chambers 34 and 40 are filled with lubricating oil supplied through non-return inlet check valves 44 and 46. Oil from the engine lubrication system of the engine is fed to the valves 44 and 46 by a series of interconnected passageways comprising a bore 48 in the rod 26, a groove 49 encircling the pin 28, an outlet 50 at the top of the rod 26, a spring loaded slipper collector 52 in the piston carrier 24, a spring chamber 54, and passages 56 and 58 within the carrier 24. Oil is discharged from the upper chamber 34 when it exceeds a predetermined pressure therein by means of a preset spring loaded discharge valve 60, all of which are described in greater detail in the aforementioned U.S. Pat. No. 3,303,831. During compression and firing, the discharge valve 60 limits the maximum allowable pressure in the upper chamber 34 which, in turn, assures that the engine peak firing pressure does not exceed a predetermined maximum pressure.

Oil may be controllably discharged from the lower chamber 40 through a fixed orifice 62 in the ring 42 to thereby control the amount of relative movement between the piston shell 18 and the carrier 24 on the exhaust intake stroke. Oil discharged from orifice 62 and discharge valve 60 returns directly to the crankcase of the engine 10. It should be noted that as oil is bled from the orifice 62 to thereby permit a decrease in the volume of the lower chamber 40, the volume of the upper chamber 34 increases and is filled with oil from inlet valve 44. Conversely, when oil is bled from the discharge valve 60 to permit a decrease in the volume of the upper chamber 34, the volume of the lower chamber 40 increases and is filled with oil from the inlet valve 46.

During the latter part of each upward stroke of the VCR piston 12 and the early part of each downward stroke, the inertia of the oil in the connecting rod 26 acting upwardly creates a pressure in the passageways 56 and 58. This pressure tends to open the inlet valves 44 and 46 and pumps oil into the upper and lower chambers 34 and 40. At the same time, the inertia of the piston shell 18, also acting upwardly, tends to raise the piston shell 18 relative to the carrier 24. During the compression and power strokes, this tendency is less than the tendency for opposite motion caused by the gas pressure acting on the piston crown 30. During the compression and power strokes, the gas pressure acting on the piston crown 30 is transmitted to the carrier 24 through the oil in the upper chamber 34 creating a high oil pressure in the chamber 34. Whenever the gas pressure exceeds a selected upper limit, sufficient oil pressure is built up on the upper chamber 34 to open the discharge valve 60 and release some of the oil allowing the shell 18 to move downwardly relative to the carrier 24, thus decreasing the compression ratio in the cylinder 11. Thus, as the piston 12 is in a compression stroke approaching the cylinder head 14, the volume of the main combustion chamber 16 will vary because of the aforementioned relative movement between the piston shell 18 and carrier 24.

Two spaced apart parallel projections 70 and 72, having surfaces 71 and 73 respectively, are connected to and extend upwardly a predetermined distance from the crown 30 of the piston 12; and two spaced apart projections 74 and 76, having surfaces 75 and 77 respectively, are connected to and extend downwardly a predetermined distance from the bottom surface 32 of the cylinder head 14 closing the cylinder 11. Preferably, the projections 70 and 72 are integral with the piston crown 30, and the projections 74 and 76 are integral with the cylinder head 14.

As can be best seen in FIGS. 1, 3 and 5, the projections 70 and 72 are preferably, but not necessarily, spaced equidistant to opposite sides of the center of the bore of the cylinder 11, and each has opposite ends 78 and 80. The projections 70 and 72 do not extend across the entire surface of the piston crown 30, but terminate a predetermined distance from the periphery of the piston such that the ends 78 and 80 of each projection 70 and 72 are spaced from the wall of the cylinder 11. Thus, the space defined between the pair of projections 70 and 72 is open at its opposite ends 78 and 80.

Likewise, as can be best seen in FIGS. 1, 4 and 5, the projections 74 and 76 are spaced equidistant to opposite sides of the center of the bore of the cylinder 11, and each has opposite ends 82 and 84. The projections 74 and 76 do not extend completely across the bore of the cylinder 11, but terminate a predetermined distance from the wall of the cylinder such that the ends 82 and 84 of each projection 74 and 76 are spaced from the wall of the cylinder 11. Thus, the space defined between the pair of projections 74 and 76 is open at its opposite ends 82 and 84.

Preferably, the intake and exhaust ports 86 and 88 (FIG. 4), respectively, and the spark plug 89 of a spark ignition engine are disposed between the projections 74 and 76. In the case of a compression ignition engine, the injection nozzle is disposed between the projections 74 and 76. Locating the intake and exhaust ports between the projections 70, 72 and 74, 76 eliminates interference between the projections, takes advantage of the valve pockets in the piston, when they are provided, by making them part of the precombustion chamber, utilizes the air flow during intake and exhaust valve overlap to cool the precombustion and secondary combustion chambers and provides for complete scavenging of the precombustion chamber.

Figure 2:
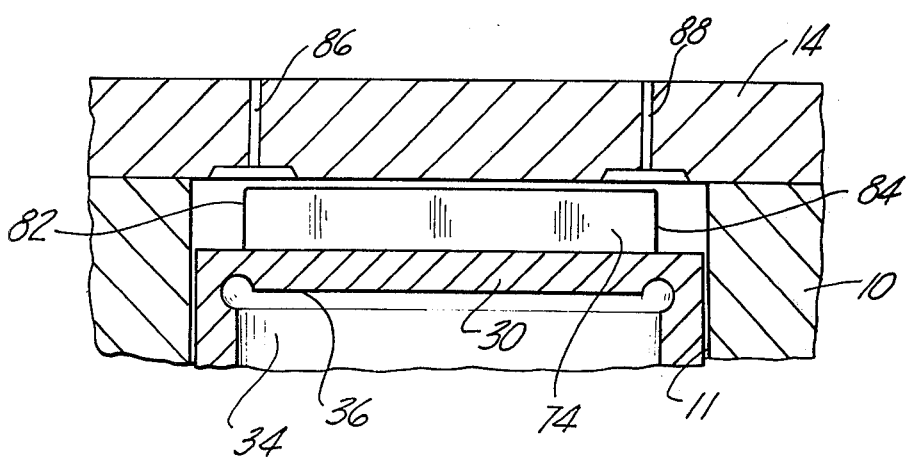
FIG. 2 is a sectional view of the piston taken substantially along line 2—2 of FIG. 1.

Referring to FIGS. 1, 2 and 3, when the piston 12 is proximate top dead center of its stroke in the cylinder 11, the sealing surfaces 71 and 73 mate in sealing juxtaposition with the sealing surfaces 75 and 77, thus defining a precombustion chamber 90 (FIG. 1) and two secondary combustion chambers 92 and 94 in the main combustion chamber 16, i.e., the main combustion chamber 16 is divided into a precombustion chamber 90 and two secondary combustion chambers 92 and 94. Simultaneously, four apertures or throats 96, 98, 100 and 102 (FIG. 5) are formed. Throats 96 and 98 are each defined by the ends 78, 82 of projections 70, 74, and 72, 76, respectively, and the wall of the cylinder 11. Throats 100 and 102 are each defined by the ends 80 and 84 of the projections 72, 76 and 70, 74, respectively, and the wall of the cylinder 11. These throats 96, 98, 100 and 102 provide for communication between the precombustion chamber 90 and the secondary combustion chambers 92 and 94 to allow for flame front propagation from the precombustion chamber 90 to the secondary combustion chambers 92 and 94.

The number of throats can be changed by extending any of the projections such that the ends thereof are located at the periphery of the piston 12 immediately adjacent the wall of the cylinder, thus eliminating the throat defined therebetween. Furthermore, the area of the throats are controlled in the same manner, i.e., by changing the length of the projections.

An alternative construction of the preferred embodiment comprises extending the projections 70 and 72 across the entire crown of the piston and extending the projections 74 and 76 across the bore of the cylinder into juxtaposition with the wall of the cylinder, thereby eliminating the throats 96, 98 and the throats 100 and 102, and spacing the sealing surface 75 from the sealing surface 77. The spaces between the sealing surfaces 71 and 73 and between the sealing surfaces 75 and 77 constitute the required apertures or throats between the precombustion chamber and secondary combustion chambers.

Other modifications to the shapes and contours of the projections 70, 72, 74, 76 may be made to vary the number, size and/or shape of the throats, or to effect a variable rather than a straight progressive opening and closing thereof. For instance, projections 70 and 72 may be one continuous projection in the shape of an oval with or without straight sides. The projections 74 and 76 then would also be oval shaped to mate with the projections 70 and 72. The clearance space between the piston projection and the cylinder head projection when in juxtaposition constitutes an interconnecting throat between combustion chambers. Aligned discontinuities could be provided in the piston and the cylinder head projections to constitute a throat between the combustion chambers.

Referring once again to FIG. 1, it can be seen that the projections 70 and 72, and the projections 74 and 76, have a depth, or dimension, in the direction of travel of the piston 12 sufficient to form the precombustion chamber 90 and secondary chambers 92 and 94 before and after the piston 12 reaches top dead center of its stroke. This attribute in a compression ignition engine provides for the formation of the precombustion chamber 90 and secondary combustion chambers 92 and 94 at, or just before, the injection of fuel, and in an ignition system engine it provides for the formation of the precombustion chamber 90 before, or at the time, of ignition.

The projections 70 and 72, and their associated sealing surfaces 71 and 73, are, for example, machined from the piston crown 30, while the projections 74 and 76 are, for example, formed by the addition of bar members to the cylinder head.

The projections on the piston and the cylinder head may be aligned square with respect to the wrist pin 28 rather than parallel to it as shown in FIG. 1. With the projections square to the centerline of the wrist pin 28, the sealing clearance dimension between mating projection surfaces changes very little during piston rockover at top dead center.

The foregoing detailed description is given primarily for clarity of understanding and no unnecessary limitations should be understood therefor, for modifications will be obvious to those skilled in the art upon reading this disclosure and may be made without departing from the spirit of the invention or the scope of the appended claims.

I claim:

1. In combination with an internal combustion engine wherein a reciprocating piston moves in a cylinder, and wherein a cylinder head cooperates with the cylinder and piston to define a combustion chamber, the improvement comprising:

means extending from the crown of the piston into the combustion chamber;

means extending from the cylinder head into the combustion chamber;

said means extending from the piston and said means extending from the cylinder head cooperating to define at least one precombustion chamber and at least one secondary combustion chamber interior to the combustion chamber;

at least one aperture for providing communication between the precombustion chamber and the secondary combustion chamber;

said means extending from the piston comprising two generally elongated projections in spaced apart relationship, each of said projections having two ends;

said means extending from the cylinder head comprising two generally elongated projections in spaced apart relationship, each of said projections having two ends;

one of said projections of the piston being in sealing juxtaposition to one of said projections of the cylinder head, and the other of said projections being in sealing juxtaposition to the other of said projections of the cylinder head when the piston is proximate top dead center of its stroke, thereby defining said precombustion chamber and said secondary combustion chamber;

at least one end of one of said projections of the piston being spaced inwardly from the periphery of the piston and at least one end of said projection of the cylinder head adjacent said one end of the piston being spaced from the wall of the cylinder bore, thereby defining said aperture between said adjacent ends of said projections and the wall of the cylinder.

2. The improvement as defined in claim 1 wherein said two projections of the piston are substantially parallel and equally spaced from the center of the piston; and said two projections of the cylinder head are substantially parallel and equally spaced from the center of the cylinder bore.

3. The improvement as defined in claim 1 including an inlet port and an exhaust port opening into the cylinder interior to said precombustion chamber.

4. The improvement as defined in claim 1 wherein the space between the two projections of the piston is less than the space between said two projections of the cylinder head.

5. The improvement as defined in claim 1 including an inlet port and an exhaust port opening into the cylinder and disposed between said two projections of the piston.

6. The improvement as defined in claim 1 wherein said projections of the piston and said projections of the cylinder head project a sufficient distance into the combustion chamber to form said precombustion chamber during a predetermined distance of travel of the piston in the cylinder before and after the piston reaches top dead center of its stroke.

7. The improvement as defined in claim 1 including means to introduce fuel into the cylinder interior to said precombustion chamber.

8. The improvement as defined in claim 1 including ignition means interior to said precombustion chamber.

9. The improvement as defined in claim 1 wherein the piston is a variable compression ratio piston.

10. The improvement as defined in claim 1 wherein said means extending from the piston is integral with the piston, and said means extending from the cylinder head is integral with the cylinder head.

11. An internal combustion engine including a piston having first and second parts movable relative to one another in a cylinder in response to reciprocation of the piston with respect to the combustion chamber of an engine whereby said relatively movable parts of said piston comprise a variable compression ratio piston, a cylinder head cooperating with the cylinder and the first and second parts of said piston to define the combustion chamber, the improvement comprising a first projection means extending from said second part of said piston into the combustion chamber;

a second projection means extending from a cylinder head into the combustion chamber closely adjacent to said first projection means;

said first projection means extending from the said second part of said piston and said second projection means extending from the cylinder cooperating to define at least one precombustion chamber and at least one secondary combustion chamber interior to the combustion chamber; and at least one aperture for providing communication between the precombustion chamber and the secondary combustion chamber.

* * * * *